(12) United States Patent
Dyks et al.

(10) Patent No.: US 12,004,520 B2
(45) Date of Patent: Jun. 11, 2024

(54) FILLING FOR A FOOD PRODUCT, FOOD PRODUCT WITH THE FILLING, METHOD OF MAKING THE FILLING

(71) Applicant: GRIESSON—DE BEUKELAER GMBH & CO. KG, Polch (DE)

(72) Inventors: Jutta Dyks, Mayen (DE); Fuad Hajji, Mülheim-Kärlich (DE); Tim-Arne Sidenstein, Mayen (DE); Christoph Koch, Koblenz (DE)

(73) Assignee: GRIESSON—DE BEUKELAER GMBH & CO. KG, Polch (DE)

( * ) Notice: Subject to any disclaimer, the term of this patent is extended or adjusted under 35 U.S.C. 154(b) by 99 days.

(21) Appl. No.: 17/341,838

(22) Filed: Jun. 8, 2021

(65) Prior Publication Data

US 2021/0386079 A1 Dec. 16, 2021

(30) Foreign Application Priority Data

Jun. 10, 2020 (EP) ..................... 20179327

(51) Int. Cl.
*A21D 13/38* (2017.01)
*A23C 13/14* (2006.01)
(52) U.S. Cl.
CPC .............. *A21D 13/38* (2017.01); *A23C 13/14* (2013.01)

(58) Field of Classification Search
None
See application file for complete search history.

(56) References Cited

U.S. PATENT DOCUMENTS 4,812,318 A 3/1989 Finkel

FOREIGN PATENT DOCUMENTS

| DE | 10 2012 015 455 A1 | 2/2014 | |
|---|---|---|---|
| EP | 0 906 726 A2 | 4/1999 | |
| EP | 2452569 A1 * | 5/2012 | .............. A23G 3/54 |
| EP | 2 452 569 B1 | 9/2016 | |
| EP | 3 369 321 A1 | 9/2018 | |

* cited by examiner

*Primary Examiner* — Jyoti Chawla
(74) *Attorney, Agent, or Firm* — Schmeiser, Olsen & Watts, LLP

(57) ABSTRACT

Provided is a filling for a food product including a viscous, essentially anhydrous fat cream and at least one hydrophilic additive embedded in the fat cream, wherein the fat cream includes at least one outer region adjacent to an outer surface of the fat cream, at least one inner region, and at least one transition region disposed between the outer region and the inner region, wherein a mass fraction C of the hydrophilic additive increases continuously along a gradient G from the inner region through the transition region to the outer region.

10 Claims, 6 Drawing Sheets

FILLING FOR A FOOD PRODUCT, FOOD PRODUCT WITH THE FILLING, METHOD OF MAKING THE FILLING

CROSS-REFERENCE TO RELATED APPLICATIONS

This application claims priority to EP 20179327.0, having a filing date of Jun. 10, 2020, the entire contents of which are hereby incorporated by reference.

FIELD OF TECHNOLOGY

The following relates to a filling for a food product, a food product, and a method of making the filling for the food product.

BACKGROUND

Cookies, wafers, or other dough-based confectionery are consumed by many people with a chocolate, cocoa, or nut nougat cream, for example as a coating or filling. The cream forms a component of the confectionery, contrasting with the much drier pastry itself. The combination of cream and pastry thus forms a complete unit that gives the consumer a pleasant feeling when consumed.

Various food products in the form of cookies, wafers, pastries or other dough-based confectionery and their production are known from the prior art. The use of fat-based fillings with hydrophilic ingredients is also known.

For example, U.S. Pat. No. 4,812,318 A discloses adding a liquid polyol to a flowable chocolate mixture to adjust the viscosity of the mixture. With the viscosity of the chocolate mixture adjusted accordingly, a cylinder of dough and chocolate mixture is poured through a cylindrical nozzle, the cylinder having an outer chocolate layer and an inner dough core.

DE 10 2012 015 455 A1 discloses a food product in the form of a long-life bakery product comprising an upper bakery product and a lower bakery product, with an intermediate layer containing a hydrophilic food ingredient between the bakery products. The hydrophilic food ingredient is to adjust the moldability of the intermediate layer.

EP 2 452 569 B1 discloses a food product having a molded casing body of cereal, the casing body having a recess into which an anhydrous filling is embedded.

EP 3 369 321 A1 describes a filled sweet pastry consisting of two pastry pieces. A lower pastry piece is formed as a body with a depression, an upper pastry piece is a lid. A filling with a first material composition is embedded in the recess of the lower pastry piece. The lid is seated on the filling. A second filling material is provided around the lid, on the filling, and adjacent the lower pastry piece to improve the durability of the lid on the filling. The second filling material differs from the main filling in having a higher melting point. The disadvantage here is that the second filling material has to be adapted in terms of formulation when the sweet or savory main filling is reformulated for a new product development. This applies in particular to the fats and oils used in order to avoid quality deficits.

EP 0 906 726 A discloses the production of a layered food product with a plate-shaped filling of chocolate comprising a filling material for joining, thereby forming a sandwich food product suitable for consumption.

SUMMARY

An aspect relates to a filling for a food product that allows increased durability and ease of preparation of the food product.

Embodiments of the present invention provide a filling, which solves the technical problem. Likewise, the task is solved by a food product and a method. Advantageous embodiments result from the dependent claims.

In a first aspect, embodiments of the invention relate to a filling for a food product comprising a viscous, substantially anhydrous fat cream and at least one hydrophilic additive embedded in the fat cream. The fat cream comprises at least one outer region adjacent an outer surface of the fat cream, at least one inner region, and at least one transition region disposed between the outer region and the inner region. A mass fraction C of the hydrophilic additive in the filling increases continuously along a gradient G from the inner region to the transition region to the outer region.

The food product may be a dough-based confectionery product, in particular a wafer product, a cookie product or a sponge cake product. The food product may comprise several components, at least one of which is the filling according to embodiments of the invention.

The fat cream, at least at usual food consumption temperatures, is viscous, i.e. has a substantially higher viscosity than water, for example a viscosity of 0.1 Pa s to 150 Pa s, in particular of 1 Pa s to 50 Pa s, measured with a rheometer at 10 Hz and 25° C.

In an embodiment, the filling may be a cocoa cream, a chocolate cream, a whole milk cream, a nougat and especially a nut-nougat cream, or any other fat-based cream or paste.

The hydrophilic additive refers to a substance that has good miscibility with water but poor miscibility with fat-based substances, especially fat-based suspensions.

According to embodiments of the invention, the filling occupies an area in the food product which can be divided into three sub-areas, an inner area, an outer area, and a transition area. The transition region is located between the inner region and the outer region, such that the inner region and the outer region are separated by the transition region. In the transition region, the mass fraction C of the hydrophilic additive increases toward the outer region and decreases toward the inner region. The mass fraction C of the hydrophilic additive is greater in the outer region than in the inner region. The mass fraction C of the hydrophilic additive within the transition area is not constant.

The mass fraction C is the fraction of the hydrophilic additive in relation to the total weight of the filling.

The change in mass fraction C in the transition region is continuous and uninterrupted. Due to the continuous change of the mass fraction C, an abrupt transition from an area with a high mass fraction C of the hydrophilic additive to an area with a low mass fraction C of the hydrophilic additive can be avoided.

When the fat cream comes into contact with the hydrophilic additive, the viscosity of the fat cream increases. The outer region, which has a higher mass fraction C of hydrophilic additive, therefore has a higher viscosity than the inner region. The inner region is creamy and/or liquid or flowable or of low viscosity, and the outer region is solid, rigid or of high viscosity at ambient temperature.

Advantageously, the increased viscosity of the outer area compared to the inner area protects the more liquid inner area from leakage or the ingress of foreign substances.

The continuous change of the mass fraction C of the hydrophilic additive advantageously connects the outer area and the inner area mechanically better than the transition of two areas of a filling without a continuous transition area. Due to the improved mechanical connection, the resistance of the filling, in particular of a food product with the filling, can be increased despite a difference in viscosities of the outer and inner regions within the filling. This is particularly advantageous for temperature and/or humidity variations of the storage environment of the food product, for example during transportation or loading of the food product.

A particular advantage of embodiments of the invention is that it is suitable for all fat-based fillings and does not require a jointing compound as a barrier layer, which would have to be applied to the filling in a separate subsequent process step. The filling is thus particularly versatile and particularly easy to manufacture. Furthermore, an unfavorable influence of a joint compound on the sensory properties of the main filling, when the baked product is consumed, can be ruled out.

In an embodiment, the filling comprises a plurality of outer and inner regions, each of which being interconnected by a transition region. For example, the filling comprises a sequence outer region—transition region—inner region—transition region—outer region. The filling may comprise any number of regions, with a transition region disposed between each outer region and each inner region.

In an embodiment, the mass fraction C of the hydrophilic additive increases monotonically from the inner region through the transition region to the outer region.

The monotonic increase of the mass fraction C of the hydrophilic additive from the inside to the outside can be realized by continuous addition of the hydrophilic additive during the production of the filling. Advantageously, this simplifies the production of the filling.

In an embodiment, at least the outer surface forms a, solid, partial region of a side surface of the filling. The partial region of the side surface may be formed, for example, as a solid reinforcing rib or adhesive rib, in particular for contact with a base body or a cover element of the food product. Furthermore, the partial area may form a leakage protection of a pastry part of the food product otherwise partially or completely enclosing the filling or a predetermined breaking edge of the food product.

In an embodiment, the outer surface forms an entire side surface of the filling. In this embodiment, the remaining surfaces of the filling are covered by a pastry portion of the food product.

In an embodiment, the outer surface forms the entire surface of the filling, forming a food product consisting only of the filling. The food product has an outer solid shell and a creamy inner core. The solid shell protects the core from the ingress of foreign bodies and/or foreign substances and from leakage. Furthermore, the solid shell gives the food product a firm, tangible structure, reducing the risk of deformation of the product during transport in bulk packaging and/or in the hand before consumption.

In an embodiment, the hydrophilic additive comprises an aqueous solution or suspension. In an embodiment, the hydrophilic additive is water. In this embodiment, the minimum proportion $C_{min}$ of the hydrophilic additive is between 0.01 and 1.5% by weight, between 0.01 and 1.0% by weight, particularly between 0.01 and 0.5% by weight, and the maximum proportion $C_{max}$ of the hydrophilic additive in this embodiment is between 0.6 and 2.5% by weight, between 0.6 and 2.0% by weight, particularly between 0.6 and 1.5% by weight.

In a further embodiment, the hydrophilic additive comprises a monohydric or a polyhydric alcohol and/or a sugar alcohol. In this embodiment, the minimum proportion $C_{min}$ of the hydrophilic additive is between 0.01 and 1.5% by weight, between 0.01 and 1.0% by weight, particularly between 0.01 and 0.5% by weight, and the maximum proportion $C_{max}$ of the hydrophilic additive in this embodiment is between 0.6 and 3.00% by weight, between 0.6 and 2.0% by weight, particularly between 0.6 and 1.0% by weight.

In an embodiment, the hydrophilic additive comprises a sugar alcohol, which comprises a flavoring agent.

Advantageously, the flavoring agent can influence the taste of the food product.

In an embodiment, the fat cream contains a fat mass fraction of from 20 to 80% by weight, from 30 to 60% by weight, and more from 40 to 50% by weight.

In a further aspect, embodiments of the invention relate to a food product comprising a solid base body and at least one filling, wherein the filling may in particular comprise a core filling, for example caramel or jam. The at least one filling is arranged on the base body, in a cavity of the base body. The at least one filling is a filling as described above and comprises at least one outer surface. The at least one outer surface of the at least one filling faces away from the base body.

Advantageously, the highly viscous outer region, which is adjacent to the outer surface of the filling, protects the creamy and/or liquid inner region of the filling from leaking and/or the ingress of foreign substances.

In a further embodiment, the food product comprises a cover element which at least partially covers a side of the filling facing away from the base body. At least one outer surface of the filling is adjacent to the cover element.

The cover element advantageously causes a consumer to be able to grasp the food product without the consumer's body heat melting the filling, particularly the solid outer portion of the filling, and causing the consumer to get their fingers dirty. The consumer can consume the food product while maintaining clean fingers.

By adjoining the outer surface of the filling to the cover element, the cover element is attached to the solid or highly viscous outer area of the filling, which improves the adhesion of the cover element on the food product. As a result, the food product is mechanically loadable and, in particular, pourable without being damaged.

The base body and/or the cover element may comprise, for example, a long-life bakery product, a cookie, a tartelette, a biscuit, a wafer, a savory cookie, in particular a cracker, and/or a chocolate body.

In an embodiment, the at least one inner region of the filling is adjacent to the base body.

The base body can be shaped like a trough or basin, with a bottom surface enclosed by a rim. The rim further encloses an area which, together with the bottom surface, forms the cavity in the base body. The inner region of the filling is enclosed upwardly via the transition region by the outer region, sideways by the rim of the base body and downwardly by the bottom surface of the base body.

The creamy and/or liquid filling in combination with the base body and the cover element increases in particular the digestibility as well as the enjoyment value of the food.

In a further embodiment, the cover element forms a projection over the base body. In particular, the filling may also form a projection over the base body. The cover element, in particular the projection, can be used as a decorative element of the food product.

In an advantageous manner, the cover element adheres better to the filling due to the increased strength of the filling in the outer area, even if the cover element protrudes over the base body.

In a further embodiment, the cover element is spaced from an edge of the recess by an edge distance. The edge distance may be between 1 and 20%, between 2 and 10%, and particularly between 3 and 6% of the diameter of the depression. The edge spacing reduces the mechanical stability of the food product compared to a food product in which the cover element extends to the edge of the cavity. Surprisingly, however, it has been found that the cover element can be attached to a filling according to embodiments of the invention in a sufficiently stable manner to obtain a food product resistant to usual mechanical loads, due to the solidified outer region of the filling, despite an edge spacing.

Advantageously, by spacing the cover element from the edge of the cavity, the consumer of the food product can see the filling and look forward to the creamy mouthfeel of the filling. This stimulates the consumer's appetite for the food product. Furthermore, the consumer can perceive whether he or she has grabbed the right food product, especially the food product with the desired filling, before consuming it, thus preventing an unwanted taste triggered by a filling that the consumer did not want.

In another aspect, embodiments of the invention relates to a method of making a filling as described above. The method comprises the steps of:
a) providing the fat cream and the hydrophilic additive for the filling in separate storage containers from each other,
b) substantially simultaneously applying a, turbulent, fat cream stream of the fat cream and applying a, turbulent, additive stream of the hydrophilic additive through at least two channels separated from each other onto a surface,
c) wherein the fat cream stream is at least partially mixed with the additive stream outside the channels.

In particular, the application of the fat cream stream may precede the application of the additive stream to form the inner region without the hydrophilic additive. Furthermore, the additive stream can end after the fat cream stream to form a closed outer region.

Turbulence in the additive stream advantageously ensures good mixing of the fat cream with the hydrophilic additive, forming a uniform and more homogeneous filling. Homogeneous in this context means that the filling has a homogeneous composition within a layer perpendicular to the gradient G. If the food product consists of only one filling, this layer is for example a spherical shell of the food product. If the food is a flat pastry, the layer is, for example, a plane parallel to the base body.

During the substantially simultaneous application of the fat cream stream and the additive stream, the transition region is advantageously formed, followed by the outer region.

Advantageously, the fat cream and the additive stream are mixed outside the channels. When the fat cream is mixed with the hydrophilic additive, the fat cream becomes more viscous, which increases its strength. Mixing outside the channels prevents clogging of the channels by a solid filling.

In an embodiment, the channels are designed as channels of a multi-channel nozzle comprising at least one inner channel and an outer channel, arranged concentrically around the inner channel. The fat cream is applied through the inner channel and the hydrophilic additive is applied through the outer channel.

Advantageously, the substantially simultaneous application of the fat cream and the hydrophilic additive is simplified by the use of a multi-channel nozzle. Application through a multi-channel nozzle can be accomplished by a one-shot process or triple-shot process.

Advantageously, the additive stream applied around the fat stream produces a filling that is creamy on the inside and firm on the outside.

In an embodiment, the fat cream is additionally applied through an intermediate channel of the multi-channel nozzle, which is arranged, concentrically, between the inner channel and the outer channel.

Due to the additional fat cream applied through the intermediate channel, the fat cream from the inner channel remains separated from the hydrophilic additive. This ensures that the inner area of the filling remains free of the hydrophilic additive and thus creamy and/or liquid.

In a further aspect, embodiments of the invention relates to a method for producing a food product described above. The method comprises the steps of:
a) preparing the base body of the food product,
b) producing the filling on the base body, in a cavity of the base body, by a method as described above.

The at least one outer surface of the filling faces away from the base body.

In an embodiment, the method comprises preparing a solid cover element of the food product and applying the cover element to the filling, wherein the cover element at least partially covers a side of the filling opposite the base body, and wherein the at least one outer surface of the filling is adjacent to at least one outer surface of the cover element.

In an embodiment, the method comprises heating a contact surface of the filling to contact the cover element and/or a contact surface of the cover element to contact the filling prior to application and/or during application of the cover element to the filling.

The heating of the contact surface melts the filling when the cover element is applied to the filling, improving the adhesion of the cover element to the filling.

If the cover element is a baked product, the cover element is applied to the filling before the cover element has cooled down completely after baking the cover element. In this way, the residual heat of the cover element left over from baking can be used to melt the filling without the need for a separate process step or a special device for heating the contact surface. A particularly efficient process is thus achieved.

BRIEF DESCRIPTION

Some of the embodiments will be described in detail, with reference to the following figures, wherein like designations denote like members, wherein.

DETAILED DESCRIPTION

Figure 1:
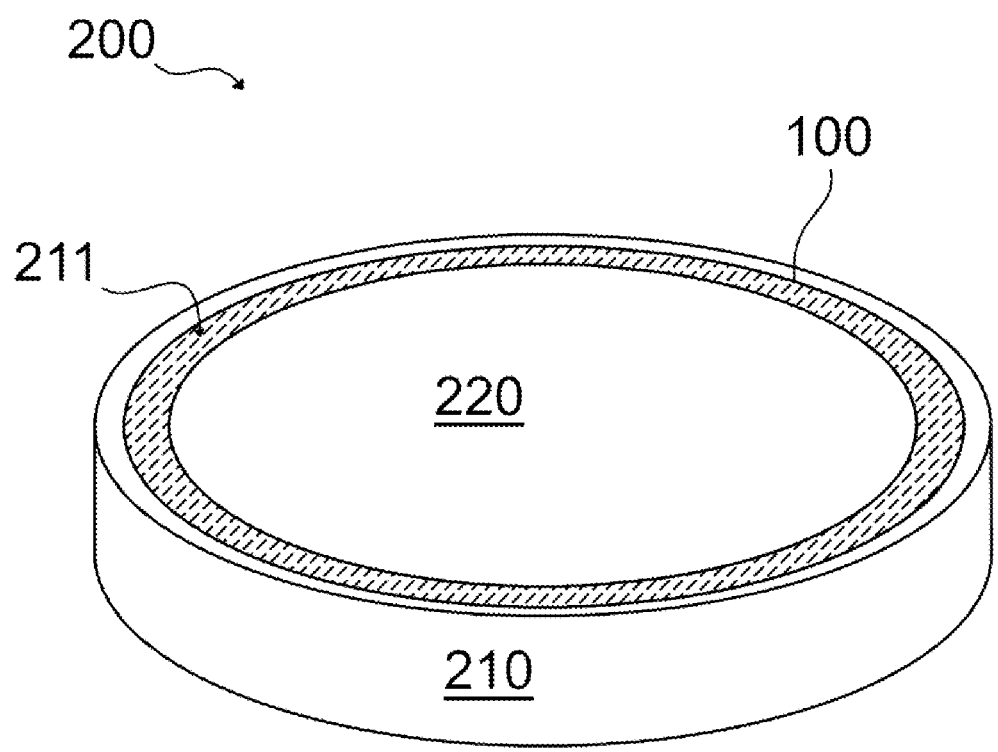
FIG. 1 shows a schematic perspective view of an embodiment of a food product.

FIG. 1 shows a perspective and schematic representation of a food product 200. The food product 200 is shown as a long-life pastry, in particular a cookie. The food product 200 comprises a base body 210, in which a depression 211 is formed. The recess 211 is filled with a filling 100, which comprises an inner region (not visible) and an outer region (shaded region). A cover element 220 is applied to the outer region.

Figure 2:
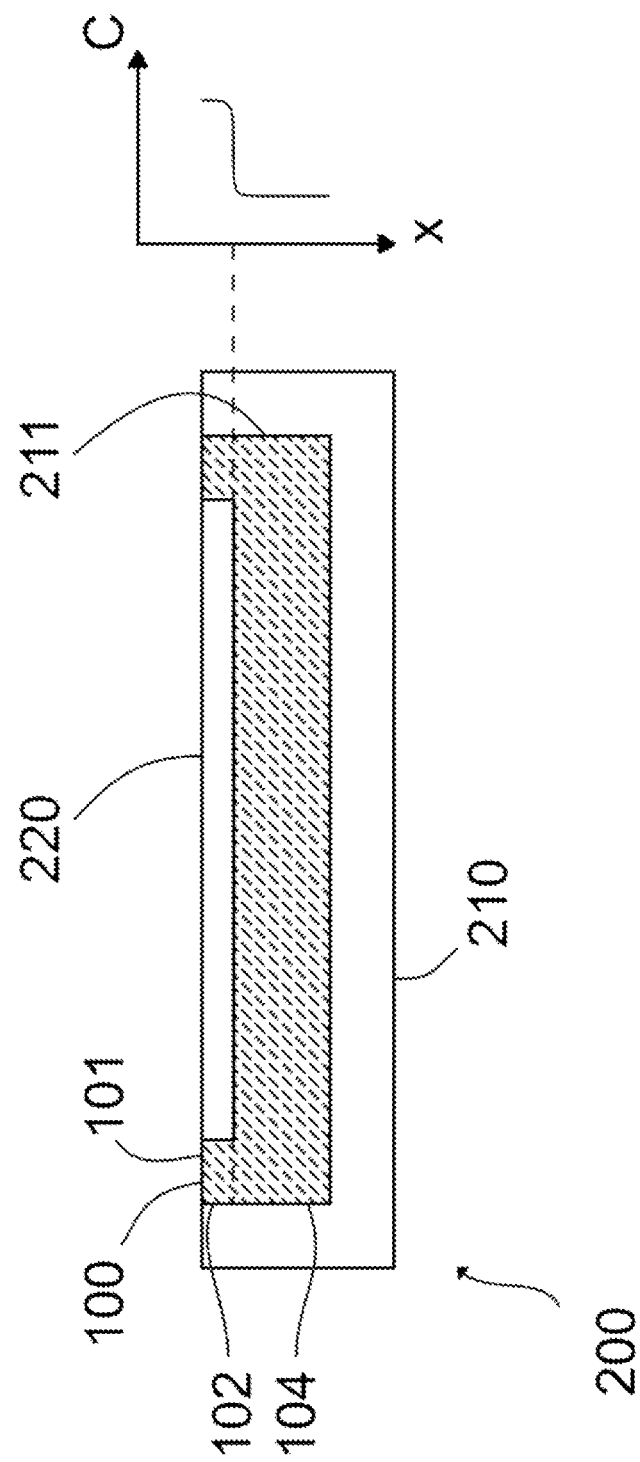
FIG. 2 shows a schematic profile of an embodiment of the food product.

FIG. 2 shows a schematic side view of the food product of FIG. 1. The filling 100 is divided into an inner region 104 and an outer region 102. A transition region is located between the inner region 104 and the outer region 102, which in the embodiment shown extends around the dashed line. Next to the food product 200, the development of the mass fraction C of the hydrophilic additive to the fat cream is shown as a function of the depth of the depression 211 along the x-axis.

In the outer region 102, the mass fraction C of the hydrophilic additive is higher than in the inner region 104. In the transition region, the mass fraction C of the hydrophilic additive decreases continuously. The steeper the course of the curve C versus x, the thinner the transition region. In an embodiment, the mass fraction C of the hydrophilic additive in the inner region 104 is equal to or close to 0.

In the illustrated embodiment, the cover element 220 is embedded within the filling 100 such that the cover element 220 is aligned with the outer surface 101 of the filling 100 and an edge of the base body 210. The outer region 102 and the inner region 104 are dimensioned such that the transition region extends substantially below the cover element 220, and the cover element 220 is surrounded all around by the outer region 102 of the filling 100. The liquid and/or creamy filling 100 of the inner region 104 is surrounded downwardly and laterally by the base body 210. Upwardly, it is prevented from leaking and protected from the ingress of foreign substances by the outer region 102 and the cover element 220 via the transition region.

Figure 3:
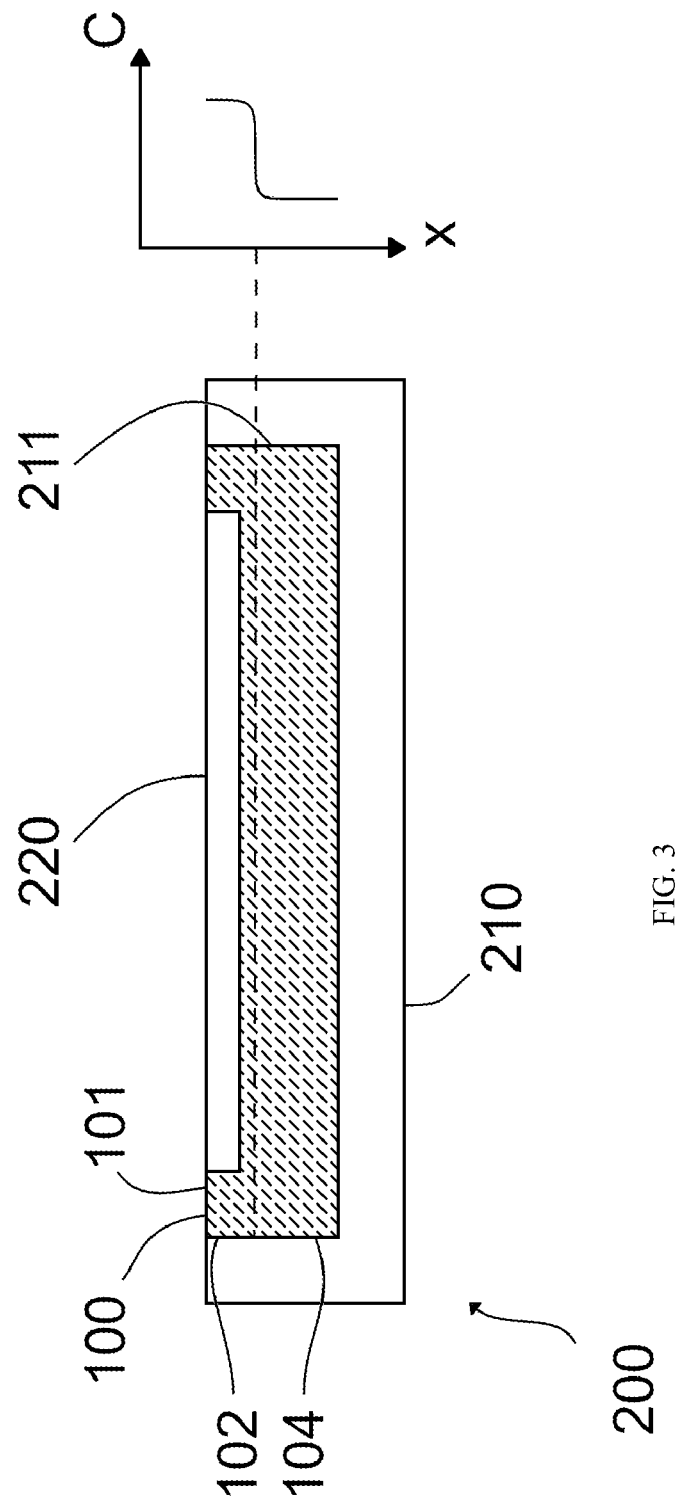
FIG. 3 shows another schematic profile of another embodiment of the food product.

FIG. 3 shows a variation of the food product 200 of FIG. 2. The difference is essentially that the transition region in the embodiment shown in FIG. 3 is located deeper (along the x-axis) in the recess 211 than in the embodiment shown in FIG. 2. The progression of the mass fraction C versus x and the dashed line indicate this. A portion of the outer region 102 extends below the cover element 220, which provides a stronger adhesion of the cover element 220 to the filling 100.

Figure 4:
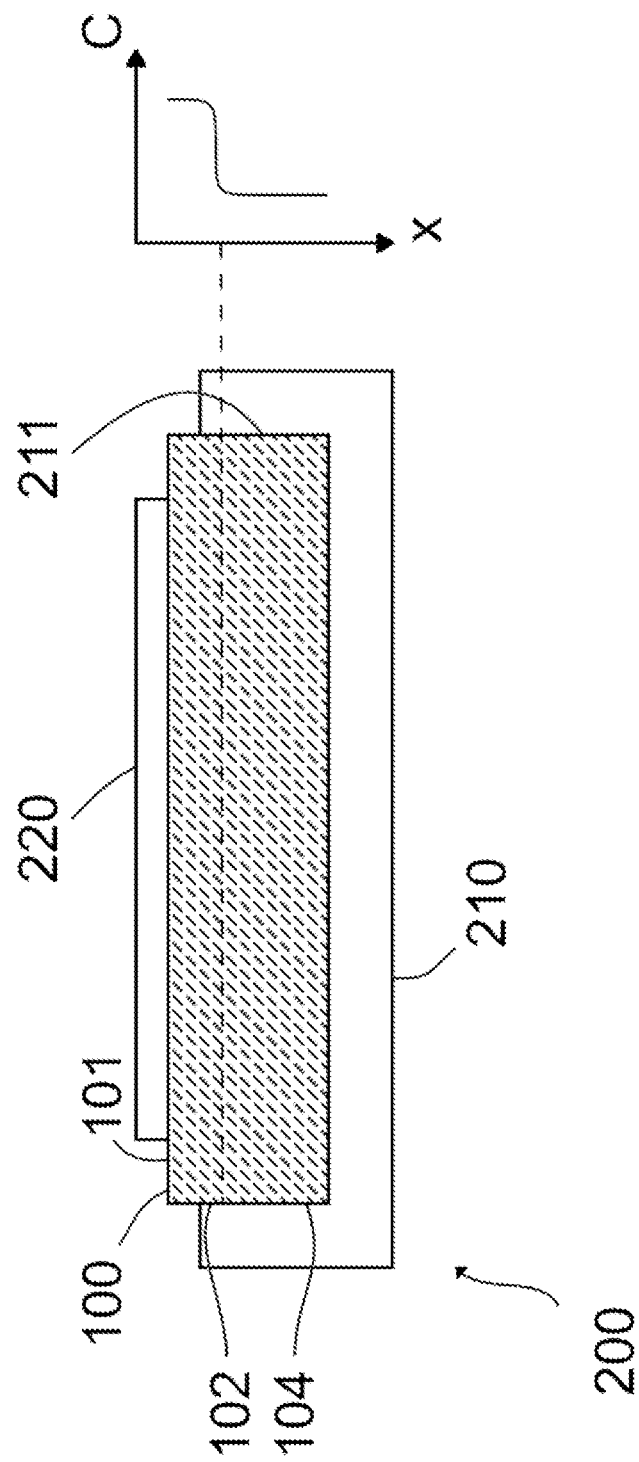
FIG. 4 shows another schematic profile of another embodiment of the food product.

FIG. 4 shows a schematic representation of another variation of the food product 200 of FIG. 3.

In this embodiment, the outer region 102 of the filling 100 extends out of the recess 211 of the base body 210. The filling 100 has a higher mass fraction C of the hydrophilic additive in the outer region 102, so that the filling 100 is solid in the outer region 102 and does not run out of the base body 210.

The cover element 220 rests on the outer surface 101 of the filling 100 and is held to the filling by the strength of the filling 100 in the outer region.

Figure 5:
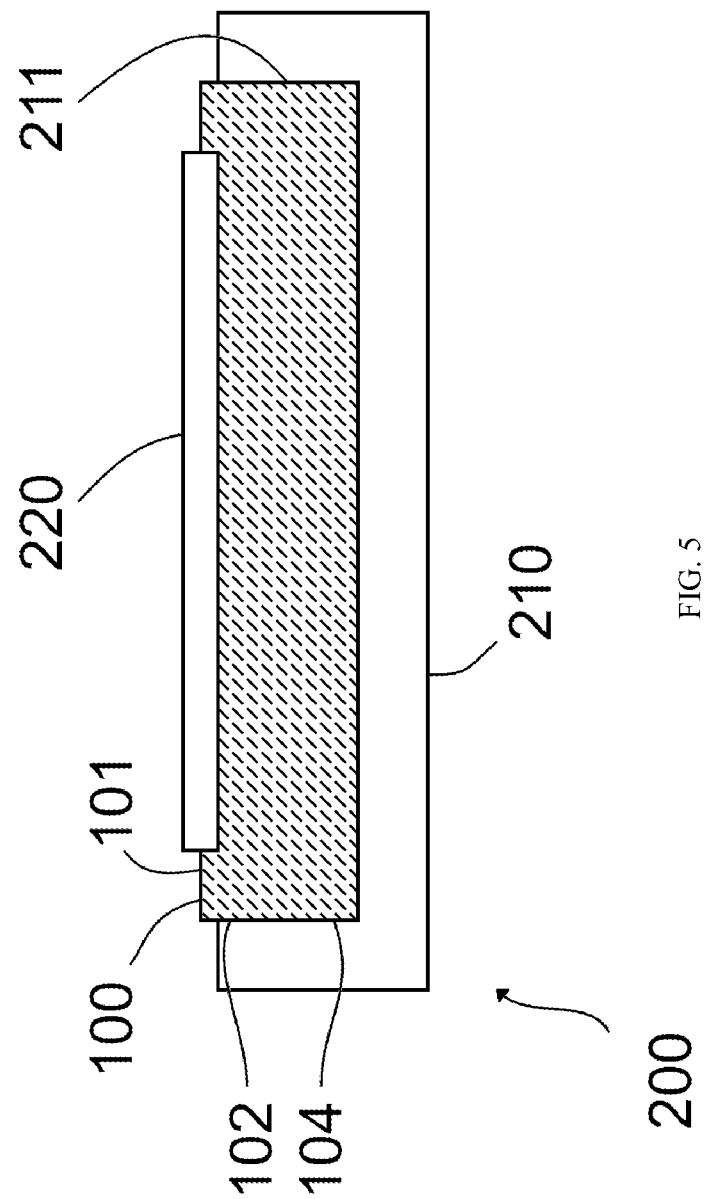
FIG. 5 shows another schematic profile of another embodiment of the food product.

The embodiment shown in FIG. 5 is a variation of the embodiment shown in FIG. 4. The embodiment shown in FIG. 5 differs from the embodiment shown in FIG. 4 in two main ways.

The first difference is that the cover element 220 is embedded in the filling 100 similar to the embodiment shown in FIG. 3. However, the cover element 220 partially protrudes from the outer surface 101 of the filling 100.

The second difference from the embodiment of FIG. 4 is the variation of the mass fraction C of the hydrophilic additive depending on the depth of the recess 211 along the x-axis. The mass fraction C decreases much more slowly with increasing depth than in the embodiments shown in FIGS. 2 to 4. Due to the slower change in mass fraction C, the transition region is wider. Precise location of the transition region is difficult in the embodiment of FIG. 5, which is why the dashed line is not shown.

The viscosity of the filling 100 changes more slowly, resulting in further increased mechanical stability of the outer region 102 as it is more strongly bonded to the rest of the filling 100. As a result, the cover element 220 adheres better to the food 200 due to the slower change in mass fraction C.

Figure 6:
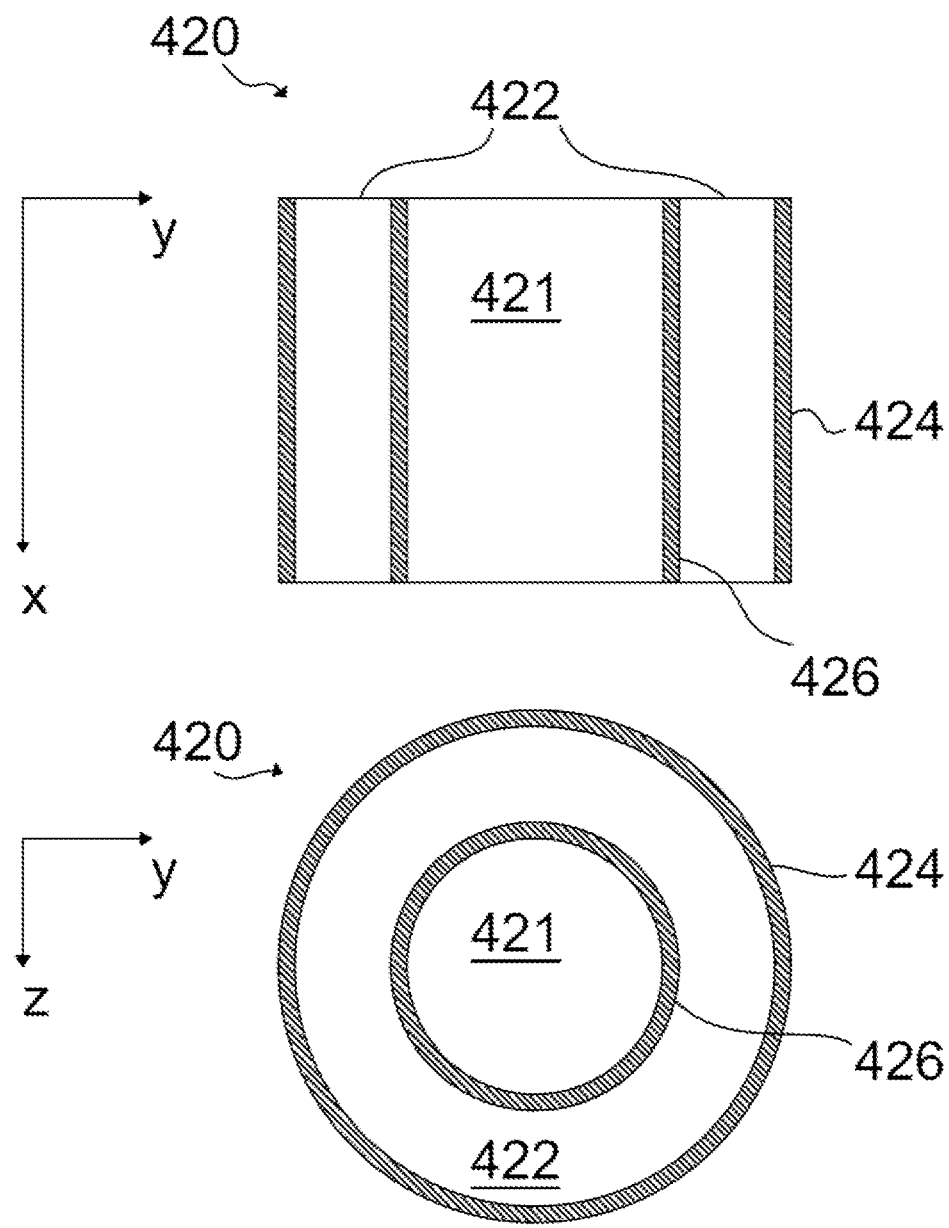
FIG. 6 shows a multi-channel nozzle from two perspectives as a section.

FIG. 6 shows a cross-sectional view of a multi-channel nozzle 420 from two perspectives. The upper part of FIG. 6 shows a side section (along the x-y-plane) of the multichannel nozzle 420. The lower part of FIG. 6 shows a horizontal section (along the y-z-plane) of the multichannel nozzle 420.

The multi-channel nozzle 420 includes a plurality of channels, in particular an inner channel 421 and an outer channel 422. The inner channel 421 and the outer channel 422 are separated from each other by the inner channel wall 426. The outer channel 422 is bounded radially inwardly by the inner channel wall 426 and outwardly by the outer channel wall 424.

In the illustrated embodiment, the inner channel 421 and the outer channel 422 run parallel to each other and are arranged coaxially so that the substances exiting through the channels leave the multi-channel nozzle 420 parallel to each other. Alternatively, the inner channel wall 426 and in particular the outer channel wall 424 may converge conically to improve the mixing of the substances applied through the multi-channel nozzle 420.

The fat cream flow flows through the inner channel 421. The additive flow flows through the outer channel 422. The mass fraction C of the hydrophilic additive in the filling can be adjusted by the flow rate of the streams. If the additive flow is lower for the same fat cream flow, the mass fraction C is also low. If the additive flow is higher, the mass fraction C is also higher.

The radii of the channels also determine the fat cream flow and the additive flow. The larger the radii, the more substance can be applied through the corresponding channel. The ratio of the radii also determines the ratio of the flows to each other.

The amount of fat cream and additive applied can thus be adjusted via the respective flow or pressure in the respective channel and the radius of the respective channel.

In further embodiments not shown, the multi-channel nozzle 420 may comprise further channels, each concentrically arranged around the other.

Although the invention has been illustrated and described in greater detail with reference to the preferred exemplary embodiments, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

LIST OF REFERENCE SIGNS

| | |
|---|---|
| 100 | Filling |
| 101 | Outer surface |
| 102 | Outer region |
| 104 | Inner region |
| 200 | Food product |
| 210 | Base body |

| | |
|---|---|
| 211 | Recess |
| 220 | Cover element |
| 420 | Multichannel nozzle |
| 421 | Inner channel |
| 422 | Outer channel |
| 424 | Outer channel wall |
| 426 | Inner channel wall |

The invention claimed is:

1. A filling for a food product
   a) comprising a viscous, water-free fat cream,
   b) the fat cream having a higher viscosity than water, and
   c) at least one hydrophilic additive embedded in the fat cream,
   d) wherein the fat cream comprises at least one outer region adjacent to an outer surface of the fat cream, at least one inner region, and at least one transition region arranged between the outer region and the inner region,
   e) wherein a mass fraction C of the hydrophilic additive in the filling continuously increases along a gradient G from the inner region via the transition region to the outer region,
   f) wherein the hydrophilic additive comprises an aqueous solution or suspension, wherein a minimum proportion $C_{min}$ of the aqueous solution or suspension on the filling is from 0.01 wt. % to 1.5 wt. % and a maximum proportion $C_{max}$ of the aqueous solution or suspension on the filling is from 0.6 wt. % to 2.5 wt. %, or
   g) wherein the hydrophilic additive is at least a monohydric or polyhydric alcohol and/or a sugar alcohol, wherein a minimum proportion $C_{min}$ of the alcohol and/or sugar alcohol in the filling is from 0.01 wt. % to 1.5 wt. % and a maximum proportion $C_{max}$ of the alcohol and/or sugar alcohol in the filling is from 0.6 wt. % to 3.0 wt. %.

2. The filling according to claim 1, wherein the mass fraction C increases monotonically from the inner region via the transition region to the outer region.

3. The filling according to claim 1, wherein the outer surface forms at least a partial area of a side surface of the filling.

4. The filling according to claim 1,
   a) wherein the hydrophilic additive comprises an aqueous solution or suspension,
   b) wherein the minimum proportion $C_{min}$ is from 0.01 wt. % to 1.0 wt. % and the maximum proportion $C_{max}$ is from 0.6 wt. % to 2.0 wt. %.

5. The filling according to claim 1,
   a) wherein the hydrophilic additive is at least one monohydric or polyhydric alcohol and/or a sugar alcohol, wherein
   b) the minimum proportion $C_{min}$ is from 0.01 wt. % to 1.0 wt. % and the maximum proportion $C_{max}$ is from 0.6 wt. % to 2.0 wt. %.

6. The filling according to claim 1, wherein the fat cream contains a fat mass fraction of from 20% by weight to 80% by weight.

7. A food product comprising:
   a) a solid base body and
   b) at least one filling according to claim 1,
   c) wherein the filling is arranged on the base body,
   d) wherein the at least one outer surface of the filling faces away from the base body.

8. The food product according to claim 7,
   a) comprising at least one solid cover element,
   b) wherein the cover element at least partially covers a side of the filling facing away from the base body, and
   c) wherein the at least one outer surface of the filling is adjacent to the cover element.

9. The food product according to claim 8,
   a) wherein the filling is arranged in a depression of the base body, wherein the cover element is spaced apart from an edge of the depression by an edge distance, the edge distance being 1% to 20%, of a diameter of the depression and/or
   b) wherein the cover element forms a projection over the base body.

10. The food product according to claim 7, wherein the at least one inner portion of the filling is adjacent to the base body.

* * * * *